(12) United States Patent
Dowlatkhah et al.

(10) Patent No.: US 10,884,407 B2
(45) Date of Patent: Jan. 5, 2021

(54) MANAGEMENT OF DEPLOYED DRONES

(71) Applicant: AT&T INTELLECTUAL PROPERTY I, L.P., Atlanta, GA (US)

(72) Inventors: Sangar Dowlatkhah, Alpharetta, GA (US); Venson Shaw, Kirkland, WA (US); Zhi Cui, Sugar Hill, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/056,353

(22) Filed: Aug. 6, 2018

(65) Prior Publication Data
US 2018/0348748 A1 Dec. 6, 2018

Related U.S. Application Data

(63) Continuation of application No. 15/048,759, filed on Feb. 19, 2016, now Pat. No. 10,048,684.

(51) Int. Cl.
*G05D 1/00* (2006.01)
*G08C 17/02* (2006.01)
(Continued)

(52) U.S. Cl.
CPC ......... *G05D 1/0027* (2013.01); *B64C 39/024* (2013.01); *G05D 1/104* (2013.01);
(Continued)

(58) Field of Classification Search
CPC .... G05D 1/0027; G05D 1/104; G08G 5/0008; G08G 5/0069; H04B 7/18504;
(Continued)

(56) References Cited

U.S. PATENT DOCUMENTS 9,022,324 B1 5/2015 Abhyanker
9,125,987 B2 9/2015 Levien et al.
(Continued)

FOREIGN PATENT DOCUMENTS

WO WO 2015/139733 9/2015

*Primary Examiner* — Christian Chace
*Assistant Examiner* — Jordan S Fei
(74) *Attorney, Agent, or Firm* — Amin, Turocy & Watson, LLP

(57) ABSTRACT

Methods, apparatus, systems and articles of manufacture (e.g., physical storage media) to manage deployed drones are disclosed. Example methods disclosed herein include detecting, by a first drone, whether the first drone is in communication with a command center via a first communication network to determine a configuration parameter of a first message to broadcast discovery information associated with the first drone. Disclosed example methods also include, in response to the first drone being in communication with the command center via the first communication network, broadcasting, from the first drone, the first message configured with a first value for the configuration parameter. Disclosed example methods further include, in response to the first drone not being in communication with the command center via the first communication network, broadcasting, from the first drone, the first message configured with a second value for the configuration parameter different from the first value.

20 Claims, 10 Drawing Sheets

(51) Int. Cl.
*B64C 39/02* (2006.01)
*H04B 7/185* (2006.01)
*G05D 1/10* (2006.01)
*G08G 5/00* (2006.01)
*H04W 8/00* (2009.01)
*H04W 48/16* (2009.01)
*H04W 88/04* (2009.01)

(52) U.S. Cl.
CPC ........... *G08C 17/02* (2013.01); *G08G 5/0008* (2013.01); *G08G 5/0069* (2013.01); *H04B 7/18504* (2013.01); *B64C 2201/027* (2013.01); *B64C 2201/122* (2013.01); *B64C 2201/14* (2013.01); *H04W 8/005* (2013.01); *H04W 48/16* (2013.01); *H04W 88/04* (2013.01)

(58) Field of Classification Search
CPC .............. B64C 39/024; B64C 2201/14; B64C 2201/122; B64C 2201/027; G08C 17/02; H04W 8/005; H04W 48/16; H04W 88/04
See application file for complete search history.

(56) References Cited

U.S. PATENT DOCUMENTS

| | | | |
|---|---|---|---|
| 2005/0226201 A1* | 10/2005 | McMillin | H04L 45/00 370/348 |
| 2006/0013177 A1* | 1/2006 | Saito | H04L 45/26 370/338 |
| 2014/0254896 A1 | 9/2014 | Zhou et al. | |
| 2015/0120094 A1 | 4/2015 | Kimchi et al. | |
| 2015/0236778 A1 | 8/2015 | Jalali | |
| 2015/0304885 A1 | 10/2015 | Jalali | |
| 2015/0327136 A1 | 11/2015 | Kim et al. | |
| 2016/0050012 A1* | 2/2016 | Frolov | H04B 7/18506 455/431 |
| 2016/0155342 A1* | 6/2016 | Gibson | G01S 5/0054 701/409 |
| 2016/0204978 A1* | 7/2016 | Anderson | H04B 7/18506 370/225 |
| 2017/0019799 A1* | 1/2017 | Djordjevic | H04W 24/02 |

* cited by examiner

| | IDENTITY | CLASSIFICATION | GPS LOCATION | STATUS | SIGNAL STRENGTH | ORIGIN (LONG., LAT.) | DESTINATION (LONG., LAT.) |
|---|---|---|---|---|---|---|---|
| 305A | DRONE B | TRANSPORT | XA, YA, ZA | ACTIVE | -2 dB | 4.959615, 4.262695 | -7.841615, 14.545898 |
| 305B | DRONE C | SURVEILLANCE | XB, YB, ZB | INACTIVE | -12 dB | 2.638273, -1.739273 | 3.293273, 2.273873 |
| 305C | DRONE D | UNKNOWN | XC, YC, ZC | ACTIVE | +1 dB | 3.959615, -8.262695 | -1.534257, -3.625374 |

FIG. 3

MANAGEMENT OF DEPLOYED DRONES

CROSS-REFERENCE TO RELATED APPLICATIONS

The present application is a continuation of U.S. patent application Ser. No. 15/048,759 filed Feb. 19, 2016 and entitled "Management of Deployed Drones," which is hereby incorporated by reference in its entirety.

FIELD OF THE DISCLOSURE

This disclosure relates generally to drones, such as unmanned aerial vehicles, and, more particularly, to management of deployed drones.

BACKGROUND

Drones, such as unmanned aerial vehicles (UAVs), are mobile platforms capable of acquiring (e.g., sensing) information, delivering goods, manipulating objects, etc., in many operating scenarios. For example, drones can travel quickly, and without the physical limitations of ground based transport, to locations that are remote, dangerous, unable to be reached by human personnel, etc., or any combination thereof. Upon reaching such locations, drones can provide many benefits, such as acquiring sensor data (e.g., audio, image, video and/or other sensor data) at a target location, delivering goods (e.g., medical supplies, food supplies, engineering materials, etc.) to the target location, manipulating objects (e.g., such as retrieving objects, operating equipment, etc.) at the target location, etc. Additionally or alternatively, drones have been proposed as possible solutions for extending wireless network coverage to locations that have no existing network coverage, and/or that are experiencing weak or loss-of-signal conditions due to unexpected or planned network outages.

BRIEF DESCRIPTION OF THE DRAWINGS

FIG. 3 is an example of drone status information capable of being maintained by the example drone processing unit of FIG. 2.

The figures are not to scale. Wherever possible, the same reference numbers will be used throughout the drawing(s) and accompanying written description to refer to the same or like parts, elements, etc.

DETAILED DESCRIPTION

Figure 1:
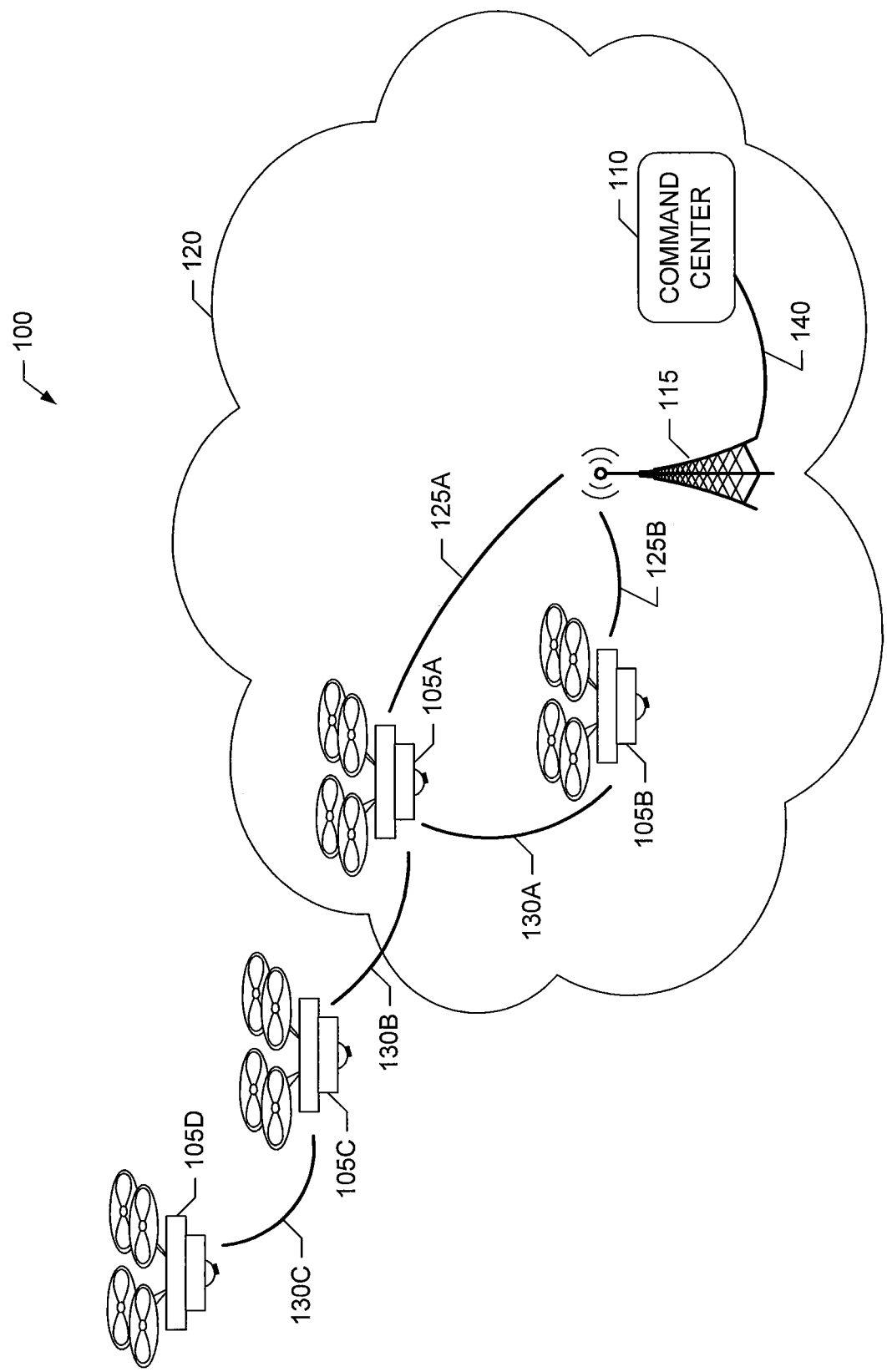
FIG. 1 is a block diagram of an example environment of use in which example deployed drones can be managed by an example command center in accordance with the teachings of this disclosure.

Example methods, apparatus, systems and articles of manufacture (e.g., physical storage media) to manage deployed drones are disclosed herein. Such examples support discovery and monitoring of drones deployed in an environment, reporting of status information for deployed drones to a command center, monitoring and control of deployed drones by the command center, etc. For example, disclosed example drone discovery methods, which may be implemented by a first drone, include detecting whether the first drone is in communication with a command center via a first communication network to determine a configuration parameter of a first message to broadcast first discovery information associated with the first drone. Some such disclosed example methods also include, in response to the first drone being in communication with the command center via the first communication network, broadcasting, with a first transceiver of the first drone, the first message configured with a first value for the configuration parameter. Some such disclosed example methods further include, in response to the first drone not being in communication with the command center via the first communication network, broadcasting, with the first transceiver, the first message configured with a second value for the configuration parameter different from the first value.

In some such disclosed examples, the configuration parameter is a time-to-live parameter specifying a number of communication hops over which the first message is to be re-broadcast. In some such examples, the first value of such a time-to-live parameter, which is used when the first drone is in communication with the command center, corresponds to a value of one hop to cause the first message to not be re-broadcast by a receiving drone that receives the first message. In some such examples, the second value of such a time-to-live parameter, which is used when the first drone is not in communication with the command center, corresponds to a value greater than one hop to cause the first message to be re-broadcast by the receiving drone.

Some such disclosed example methods further include receiving, at the first drone, a second message including second discovery information associated with a second drone, with the second message being configured with a third value for the time-to-live parameter of the second message. Some such disclosed example methods also include storing the second discovery information in association with an identifier for the second drone. Furthermore, in response to the third value specifying more than one hop for the time-to-live parameter of the second message, some such disclosed example methods include decrementing the third value to determine a fourth value for the time-to-live parameter of the second message, and re-broadcasting the second message configured with the fourth value for the time-to-live parameter.

In some such disclosed example methods, after receiving the second message, the methods further include detecting whether the first drone is in communication with the command center via the first communication network. In response to the first drone being in communication with the command center via the first communication network, some such disclosed example methods include reporting the second discovery information in association with the identifier for the second drone to the command center via the first communication network. However, in response to the first drone not being in communication with the command center via the first communication network, some such disclosed example methods include retaining, in memory, the second discovery information in association with the identifier for the second drone for later reporting to the command center.

Additionally or alternatively, some such disclosed example methods include, after receiving the second message, setting a status for the second drone to a first value to indicate the second drone is active. Some such disclosed example methods also include storing the status for the second drone in association with the identifier for the second drone. Some such disclosed example methods further include, in response to not detecting the second drone over a time interval, changing the status for the second drone to a second value to indicate the second drone is inactive.

Additionally or alternatively, in some disclosed example drone discovery methods, the discovery information includes an identifier for the first drone, an origination location for the first drone, a destination location for the first drone and a current location for the first drone. In some such examples, the origination and destination locations define a corridor along which the first drone is programmed to travel.

Additionally or alternatively, in some disclosed example drone discovery methods, the first transceiver of the first drone communicatively couples the first drone to a second communication network different from the first communication network. In some such examples, the first drone also includes a second transceiver to communicatively couple the first drone to the first communication network. For example, the second communication network may correspond to a wireless local area network, and the first communication network may correspond to a mobile cellular network, a satellite network, etc.

Example drone command methods disclosed herein, which may be implemented by an example command center, include receiving a drone status report from a first drone. In some examples, the drone status report includes first drone discovery information for the first drone and second drone discovery information for a second drone. Some such disclosed example method also include presenting, via a graphical user interface, the first drone discovery information in association with a first identifier for the first drone and the second drone discovery information in association with a second identifier for the second drone. Some such disclosed example methods further include transmitting a command to control one of the first drone or the second drone.

In some such disclosed examples, the first drone discovery information includes the first identifier for the first drone, an origination location for the first drone, a destination location for the first drone and a current location reported for the first drone. In some examples, the second drone discovery information includes the second identifier for the second drone, an origination location for the second drone, a destination location for the second drone and a current location reported for the second drone.

In some such disclosed examples, presenting the first drone discovery information includes displaying a first icon on a map, with the first icon being labeled with the first identifier and at a first map location corresponding to the current location reported for the first drone. In some such disclosed examples, presenting the second drone discovery information includes displaying a second icon on the map, with the second icon being labeled with the second identifier and at a second map location corresponding to the current location reported for the second drone. Some such disclosed example methods also include displaying a first travel corridor on the map, with the first travel corridor being based on the origination location for the first drone and the destination location for the first drone. Additionally or alternatively, some such disclosed example methods include displaying a second travel corridor on the map, with the second travel corridor being based on the origination location for the second drone and the destination location for the second drone.

These and other example methods, apparatus, systems and articles of manufacture (e.g., physical storage media) to manage deployed drones are disclosed in greater detail below.

Drones, such as UAVs, have the capability to provide many benefits in many different possible scenarios. As noted above, drones have the potential to acquire sensor data (e.g., audio, image, video and/or other sensor data), deliver materials (e.g., medical supplies, food supplies, engineering materials, etc.), manipulate objects (e.g., such as retrieving objects, operating equipment, etc.), etc., in locations that are remote, dangerous, unable to be reached by human personnel, etc. Drones have also been proposed as possible solutions for extending wireless network coverage to locations having no existing coverage and/or experiencing weak or loss-of-signal conditions. However, present-day drone operation is typically limited to scenarios in which the operator can maintain line-of-sight and direct communication with a deployed drone. Furthermore, with existing drone control systems, once direct communication with a deployed drone is lost, the control system is unable to monitor the current status of the drone. As such, deployed drones operated using such existing control system are typically programmed to return to a known staging area once direct communication with the control system is lost.

Example methods, apparatus, systems and articles of manufacture (e.g., physical storage media) disclosed herein to manage deployed drones provide technical solutions to overcome these and other limitations of existing drone control systems. For example, drone management techniques disclosed herein do not restrict drone operation just to scenarios in which direct connection(s) are maintained between a command center and the deployed drone(s). Instead, disclosed example drone management techniques provide drone discovery mechanisms by which a disclosed example drone is able to broadcast drone discovery information to neighboring drones, which can be relayed back to a disclosed example command center. Such discovery information may include, but is not limited to, an identifier for the drone, an origination location for the drone, a destination location for the first drone, a current location for the drone, classification information describing capabilities of the drone, etc. Through such disclosed example drone discovery mechanisms, the command center may monitor the current status of a deployed drone even when a direct connection between that drone and the command center is unavailable. Furthermore, in some disclosed examples, control commands may be relayed to the drone through other intermediary drones, thereby allowing the command center to also control the drone when a direct connection between that drone and the command center is unavailable. As disclosed in further detail below, these and other technical benefits can be achieved by managing deployed drones in accordance with the teachings of this disclosure.

Turning to the figures, a block diagram of an example environment of use 100 in which example deployed drones 105A-D are managed by an example command center 110 in accordance with the teachings of this disclosure is illustrated in FIG. 1. Respective ones of the example drones 105A-D may be implemented by, for example, any type of drone, such as an unmanned aerial vehicle (UAV), etc., and/or other vehicular device, such as an unmanned vehicular device, a robotic device, etc., that is, a ground vehicle, a water craft, etc. In the illustrated example of FIG. 1, the drones 105A-D are depicted as UAVs and include respective flight control units, payload units and communication units.

For example, the flight control unit of a given one of the example drones 105A-D includes any appropriate avionics, control actuators, and/or other equipment to fly the drone. The payload unit of a given one of the example drones 105A-D includes any equipment implementing features supported by the given drone. For example, the payload unit may include one or more sensors, such as one or more cameras and/or other imaging sensors, one or more microphones and/or other acoustic sensors, one or more environmental sensors (e.g., such as one or more temperature sensors, pressure sensors, humidity sensors, gas sensors, etc.), etc., or any combination thereof. Additionally or alternatively, an example payload unit for a given one of the drones 105A-D may include tools, actuators, manipulators, etc., capable of manipulating (e.g., touching, grasping, delivering, measuring, etc.) objects. Additionally or alternatively, an example payload unit for a given one of the drones 105A-D may include a portable base station, signal booster, signal repeater, etc., to provide network coverage to an area.

In the illustrated example of FIG. 1, the example drones 105A-D include communication units having one or more transceivers to enable the drones to communicate with the example command center 110 and to communicate among each other. Accordingly, and as disclosed in further detail below, the example command center 110 may be in communication with respective ones of the example drones 105A-D directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, one or more of the drones 105A-D in the example environment of use 100 of FIG. 1 include first (e.g., long-range) transceiver(s) to permit those drone(s) to communicate with an example access point 115 of an example mobility network 120. For example, at least the drones 105A and 105B of the illustrated example include such first (e.g., long-range) transceivers to enable the drones to communicate with the access point 115 of an example mobility network 120 (e.g., represented by the lines 125A-B in FIG. 1). In the illustrated example of FIG. 1, the mobility network 120 is implemented by an example mobile cellular network, such as a long term evolution (LTE) network or other third generation (3G) or fourth generation (4G) wireless network, and the access point 115 corresponds to an example cell site implementing the mobile cellular network. However, in some examples, the mobility network 120 may be additionally or alternatively be implemented by one or more other communication networks, such as, but not limited to, a satellite communication network, a microwave radio network, etc.

In the illustrated example of FIG. 1, one or more of the drones 105A-D additionally or alternatively include second (e.g., short-range) transceiver(s) to permit those drone(s) to communicate with each other. For example, each of the drones 105A-D of the illustrated example includes such a second (e.g., short-range) transceivers to enable the drones to communicate with their neighboring drone(s) (e.g., represented by the lines 130A-C in FIG. 1). In the illustrated example of FIG. 1, such second transceivers are implemented by a type of transceiver supporting short-range wireless networking. For examples, such second transceivers may be implemented by Wi-Fi transceivers, Bluetooth transceivers, infrared (IR) transceiver, etc., capable of allowing the drones 105A-D to intercommunicate via an ad-hoc or other wireless network.

In the illustrated example of FIG. 1, the command center 110 is responsible for managing drones, such as the example drones 105A-D, deployed in the example environment of use 100. For example, the command center 110 communicates with the example drones 105A-D directly via the example mobility network 120 (which is represented the line 140) and/or indirectly (e.g., via the relaying of messages among the drones 105A-D) to locate the deployed drones in the environment, identify the deployed drones in the environment, ascertain the capabilities of the deployed drones in the environment, monitor the operating status of the drones in the deployed environment, etc. Provided a deployed drone conforms to the communication messaging, protocols, etc., disclosed herein, the command center 110 can manage that drone regardless of the manufacturer, owner and/or operator of the drone.

To enable such drone management, the example drones 105A-D and the example command center 110 implement drone discovery mechanisms in accordance with the teaching of this disclosure to automate the discovery of drones that are deployed in the environment of use 100. Such drone discovery mechanisms include discovery broadcast mechanisms by which the example drones 105A-D broadcast drone discovery information to inform neighboring drones of their presence. Such drone discovery mechanisms also include discovery reporting mechanisms by which the example drones 105A-D drone report their own discovery information, as well as any discovery information received from broadcasts by neighboring drones, to the command center 110.

Via such drone discovery mechanisms, the command center 110 can treat the drones 105A-D as potential resources that can be monitored, classified and called upon as needed. For example, based on the discovery information reported by the drones 105A-D operating in the environment of use 100, the command center 110 can maintain a map of the drones that are deployed in the environment. Such a map may provide an up-to-date (e.g., real-time) inventory of the deployed drones, including drone identities, locations, capabilities, status, etc. In some examples, the command center 110 (or an operator/user of the command center) can utilize the map to select a particular deployed drone, such as one of the example drones 105A-D, to provide a particular service at a particular location. For example, the command center 110 can utilize the reported drone discovery information as maintained by such a map to select and command a deployed drone to move to a particular location to stream live video from an incident, support a search and rescue mission in a given area, take pictures/video of a particular event from different vantage points, extend network coverage at a particular location having no existing network coverage or experiencing loss-of-signal coverage, etc.

Given the capabilities provided by disclosed example drone discovery mechanisms, one or more of the example drones 105A-D may be pre-programmed or otherwise configured with default flight path(s) to be traversed in the example environment of use 100 when they are otherwise not in use. Such drone(s) can traverse their default flight paths until called upon by the command center 110. Through the reported discovery information, the command center 110 can monitor the current location(s) of such pre-programmed drone(s) along their respective flight path(s) and select (e.g., via the map, as described above) a particular drone that fits the needs of a particular service. Once the drone is no longer needed for that service, that drone can return to traversing its default flight path.

As mentioned above, disclosed example drone discovery mechanisms include discovery broadcast mechanisms by which the example drones 105A-D broadcast drone discovery information to inform neighboring drones of their presence. In some examples, to implement such discovery broadcast mechanisms, the drones 105A-D include their respective discovery information as payload data in discovery messages conforming to a discovery protocol, such the OpenFlow Discovery Protocol (OFDP), a link layer discovery protocol (LLDP), etc. The discovery information included by a given one of the drones 105A-D in such a message may include, but is not limited to, one or more of (1) a drone identifier to identify the drone, (2) drone classification information and/or other information describing the drone's capabilities, features, etc., (3) a current location of the drone, (4) origination and destination locations programmed into the drone (e.g., which define a present travel corridor along a flight path), etc. In some examples, the drones 105A-D broadcast such messages via their second (e.g., short-range) transceivers for receipt by neighboring drone(s) to inform the neighboring drones of the presence of the broadcasting drone(s). The drones that receive discovery information from broadcasting drones store the received discovery information to permit such information to be reported to the command center 110 as disclosed above and in further detail below.

In some examples, the drones 105A-D determine one or more configuration parameters of their respective discovery messages to provide a balance between the resources used by a given drone to broadcast such messages vs. ensuring that the given drone's discovery information is ultimately reported to the command center 110. For example, the discovery messages broadcast by the drones 105A-D via their second (e.g., short-range) transceivers may include a time-to-live (TTL) parameter specifying whether a discovery message broadcast by a first drone is to re-broadcast by a receiving drone via its second (e.g., short range) transceiver and, if so, how many times the discovery message should continue to be re-broadcast by any receiving drones. In other words, such a TTL parameter specifies the number of communication hops over which a discovery message may be broadcast. After the specified number of hops is reached, a receiving drone discards the received discovery message after storing the discovery information contained in the message.

Re-broadcasting of drone discovery messages enables drone discovery information broadcast by a first drone to be propagated along a chain of drones to help ensure the broadcast discovery information reaches a receiving drone that is able to report the information back to the command center 110. For example, in the example environment of use 100 of FIG. 1, the drones 105A-D are able to report drone discovery information to the command center 110 when the drones are in communication with (e.g., via their first, or long-range, transceivers) the command center 110 via the mobility network 120. However, drones that are not connected to (or in range of) the mobility network 120 are unable to report drone discovery information to the command center 110. Thus, in the illustrated example, the drones 105A and 105B, which are connected to (or in range of) the mobility network 120, are able to report drone discovery information to the command center 110, whereas the drones 105C and 105D, which are not connected to (or not in range of) the mobility network 120, are unable to report drone discovery information to the command center 110. In such examples, the propagation of broadcast drone discovery messages over multiple communication hops enables a drone discovery message broadcast by the example drone 105D via its second (e.g., short-range) transceiver to be received by the example drone 105C (corresponding to line 130C), which re-broadcasts the drone discovery message via its second (e.g., short-range) transceiver for receipt by the example drone 105A (assuming the TTL parameter is set to a value greater than one), which is able to report the drone discovery information (via its first, or long-range, transceiver) to the command center 110 via the mobility network 120.

In some such examples, to provide a balance between resource utilization vs. receipt of discovery information by the command center 110, the example drones 105A-D configure the TTL parameters of their respective drone discovery messages to have small values when the drones are in communication with the command center 110 via the mobility network 120 (or are connected to or in range of the mobility network 120) to limit the number of times a broadcasted discovery message is re-broadcast. This reduces the network bandwidth, battery power and processing overhead used for drone discovery message transmission and reception under scenarios in which drone discovery information can be reported to and is likely to be received by the command center 110. For example, the drone 105A could use a value of one (1) for its TTL parameter when the drone is in communication with the command center 110 via the mobility network 120. The TTL value of one (1) still enables at least the immediate neighboring drones relative to the drone 105A to receive the drone's broadcast discovery message (e.g., in case the drone 105A loses communication with the command center 110 thereafter), but prevents re-broadcast of the drone's discovery message (as re-broadcasting has little to no benefit while the drone 105A is still in communication with the command center 110).

However, in some examples, the drones 105A-D configure the TTL parameters of their respective drone discovery messages to have larger values when the drones are not in communication with the command center 110 via the mobility network 120 (or are not connected to or in range of the mobility network 120) to increase the number of times a broadcasted discovery message is re-broadcast. In this manner, network bandwidth, battery power and processing overhead for drone discovery message transmission and reception are increased under scenarios in which the drone discovery information likely needs to be propagated to other drones in order to be reported to and received by the command center 110. For example, the drone 105D could use a value of ten (10), or some other value greater than one (1), for its TTL parameter when the drone is not in communication with the command center 110 via the mobility network 120. A TTL value greater than one (1) enables a drone discovery message broadcast by the drone 105D to be received by it neighboring drone(s), such as the drone 105C, which can re-broadcast the discovery message its neighboring drone(s), such as the drone 105A, and so on until the number of hops specified by the value of the TTL parameter is reached. In the illustrated example, a value of the TTL parameter greater than one (1) permits drone discovery information broadcast by the example drone 105D, which is out-of-range and unable to report this information to the command center 110, to be propagated among other drones until the discovery information reaches a drone, such as the example drone 105A, that is in-range and able to report the drone discovery information to the command center 110.

To enforce the number of hops specified by the TTL parameter of a drone discovery message, receiving drone(s) decrement the TTL parameter in the received drone discovery message before re-broadcasting the message. If the value of the decremented TTL parameter is zero (0), or the original value before decrementing was one (1), the receiving drone does not re-broadcast the received drone discovery message. Otherwise, the receiving drone re-broadcasts the received drone discovery message with the updated (e.g., decremented) value for the TTL parameter.

In some examples, in addition to the drone discovery messages exchanged among the drones 105A-C, the drones 105A-C are also able to exchange messages containing other payload data via their second (e.g., short-range) transceivers. For example, the drones 105A-C may be able to exchange messages containing control commands transmitted by the command center 110. In such examples, control commands (and/or other messages) destined for a drone, such as the example drone 105D, which is out-of-range of the command center 110 can be transmitted by the command center 110 to an in-range drone, such as the example drone 105A, which reported drone discovery information for the out-of-range drone (e.g., the drone 105D) and, thus, has demonstrated the ability to communicate with the out-of-range drone directly or via one or more intermediate drones (e.g., such as the example drone 105C). When the in-range drone (e.g., the drone 105A) receives (e.g., via its first, or long-range, transceiver) a control command (and/or other message) destined for another drone (e.g., as indicated by having a drone identifier different than the identifier of the receiving drone), the receiving, in-range drone may broadcast the control message (e.g., via its second, or short-range, transceiver) with a suitable TTL value to enable the control message to propagate, if needed, to the out-of-range drone (e.g., the drone 105D). Messages from out-of-range drones (e.g., the example drones 105C and/or 105D) may be sent back to the command center 110 in a similar reverse manner.

Although the illustrated example environment of use 100 of FIG. 1 is depicted as including four drones 105A-D, one command center 110 and one mobility network 120, the teaching of this disclosure can be used to manage any number of deployed drones with any number of command centers and over any number and/or type(s) of mobility networks. For example, multiple example command centers 110 can be included in the example environment of use 100 to provide redundancy, to group management of deployed drones according to different criteria, to segment an operational area into multiple regions, etc.

Figure 2:
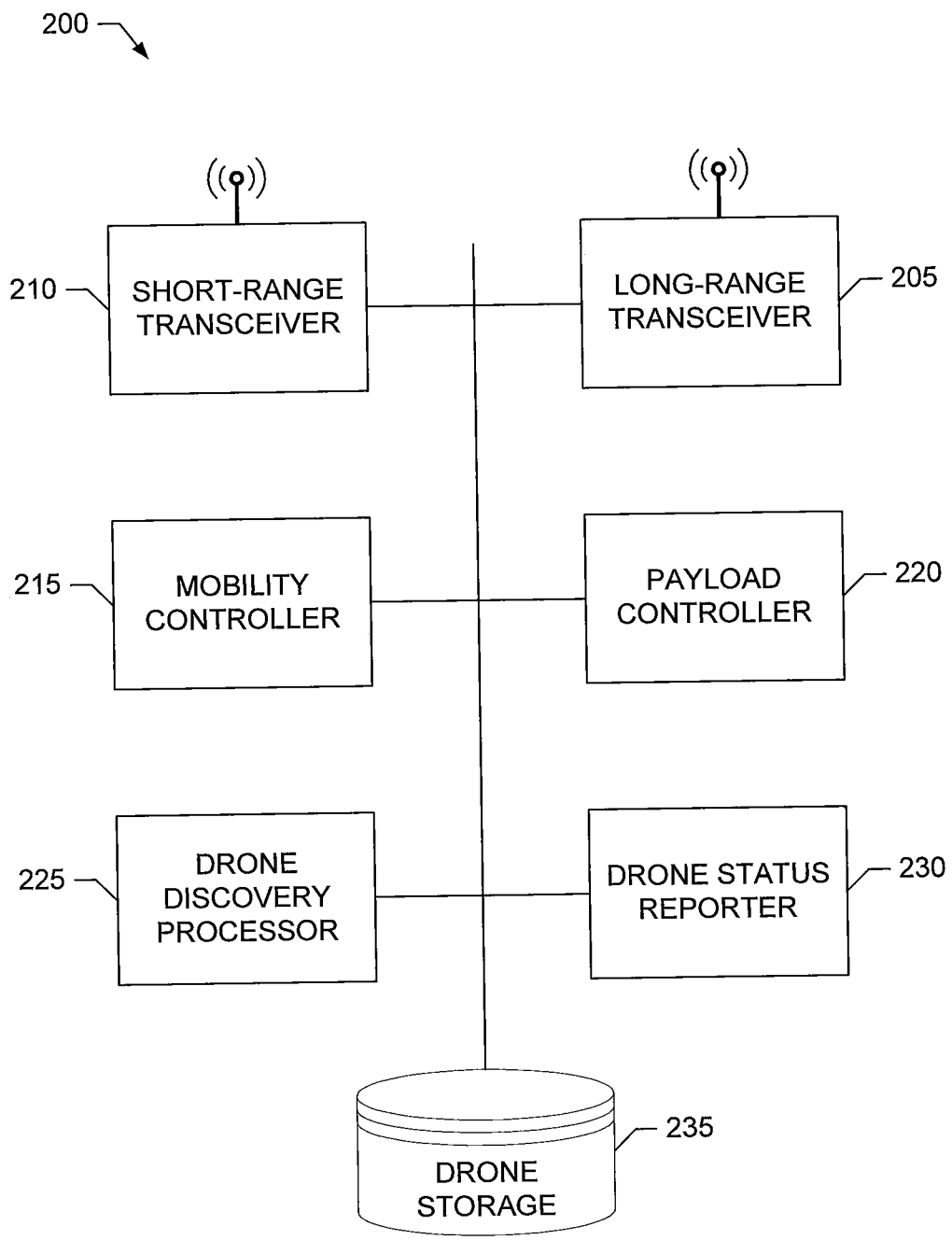
FIG. 2 is a block diagram of an example drone processing unit that can be used to implement one or more of the example drones illustrated in FIG. 1.

A block diagram of an example drone processing unit 200 that may be used to implement one or more of the example drones 105A-D of FIG. 1 is illustrated in FIG. 2. For convenience, and without loss of generality, the example drone processing unit 200 of FIG. 2 is described from the perspective of being used to implement the example drone 105A of FIG. 1. The example drone processing unit 200 of FIG. 2 includes an example long-range transceiver 205 and an example short-range transceiver 210 to implement the communication unit of the example drone 105A. In the illustrated example, the long-range transceiver 205 includes one or more transceiver modules to implement the appropriate physical layer(s) and protocol stack(s) to enable communication via the example mobility network 120 of FIG. 1. For example, the long-range transceiver 205 may include an example LTE transceiver module implementing the LTE physical layer and LTE protocol stack, and/or any other 4G and/or 3G transceiver module(s). In the illustrated example, the short-range transceiver 210 includes one or more transceiver modules to implement the appropriate physical layer(s) and protocol stack(s) to enable communication with neighboring drones in the example environment of use 100 of FIG. 1. For example, the short-range transceiver 210 may include one or more of an example Wi-Fi transceiver module implementing the Wi-Fi physical layer and Wi-Fi protocol stack, an example Bluetooth transceiver module implementing the Bluetooth physical layer and Bluetooth protocol stack, etc.

The example drone processing unit 200 of FIG. 2 also includes an example mobility controller 215 to control the flight control unit of the example drone 105A. In the illustrated example, the mobility controller 215 implements any control and feedback operations appropriate for interacting with the avionics, control actuators, and/or other equipment included in the flight control unit to fly the drone 105A.

The example drone processing unit 200 of FIG. 2 further includes an example payload controller 220 to control the payload unit of the example drone 105A. In the illustrated example, the payload controller 220 implements any control and/or reporting operations appropriate to control and/or report information from one or more cameras and/or other imaging sensors, one or more microphones and/or other acoustic sensors, one or more environmental sensors (e.g., such as one or more temperature sensors, pressure sensors, humidity sensors, gas sensors, etc.), one or more tools, actuators, manipulators, etc., capable of manipulating (e.g., touching, grasping, delivering, measuring, etc.) objects, one or more portable base stations, signal boosters, signal repeaters, etc., or any combination thereof, included in the payload unit of the example drone 105A.

To implement drone discovery in accordance with the teachings of this disclosure, the example drone processing unit 200 of FIG. 2 includes an example drone discovery processor 225, an example drone status reporter 230 and example drone storage 235. The example drone discovery processor 225 broadcasts and receives, via the example short-range transceiver 210, drone discovery messages containing drone discovery information. For example, the drone discovery processor 225 prepares drone discovery messages, which have a payload containing drone discovery information associated with the drone 105A, for broadcasting by the drone 105A. The drone discovery information contained in the message payload can include, but is not limited to, one or more of (1) a drone identifier to identify the drone 105A, (2) drone classification information and/or other information describing the capabilities, features, etc., of the drone 105A, (3) a current location of the drone 105A, (4) origination and destination locations programmed into the drone 105A (e.g., which define a present travel corridor along a flight path), (5) environmental measurements (e.g., such as weather and/or turbulence measurements) obtained from sensor(s) included in the payload unit of the drone 105A, etc.

In the illustrated example, the drone discovery processor 225 constructs and broadcasts the drone discovery messages in conformance with an OFDP protocol, such as the OFDP Internet Protocol (referred to as OFDP-IP). OFDP-IP is based on the Link Layer Discovery Protocol (LLDP) developed by for use with Institute of Electrical and Electronics Engineers 802 local area networks (LANs). However, LLDP is a link layer (also referred to as layer 2) protocol limited to use on wired LANs, such as Ethernet LANs. OFDP-IP is a network layer (also referred to as layer 3) protocol that adapts LLDP discovery advertisements for use in a radio access network domain. OFDP-IP used IP layer addressing and forwarding mechanisms, such as an IP multicast address, for sending discovery messages. In the illustrated example, the drone discovery processor 225 adapts such OFDP-IP discovery messages to include drone discovery information to create the drone discovery messages disclosed herein.

In some examples, the drone discovery processor 225 evaluates whether the drone 105A is in communication with the command center 110 via the mobility network 120 to determine one or more configuration parameters, such as a TTL parameter, for the drone discovery messages to be broadcast by the drone 105A. For example, the drone discovery processor 225 detects whether the drone 105A is in communication with the command center 110 via the mobility network 120 by invoking the long-range transceiver 205. In some such examples, the drone discovery processor 225 determines the drone 105A is in communication with the command center 110 via the mobility network 120 if the long-range transceiver 205 indicates that it is connected to, or in range of, the mobility network 120. However, if the long-range transceiver 205 indicates that it is not connected to, or is out of range of, the mobility network 120, the drone discovery processor 225 determines the drone 105A is in not communication with the command center 110 via the mobility network 120.

In response to determining the drone 105A is in communication with the command center 110 via mobility network 120, the drone discovery processor 225 configures a drone discovery message, which contains the drone discovery information associated with the drone 105A, with a first value, such as a value of one (1), for the TTL configuration parameter. However, in response to determining the drone 105A is not in communication with the command center 110 via mobility network 120, the drone discovery processor 225 configures the drone discovery message, which contains the drone discovery information associated with the drone 105A, with a second value, such as a value of ten (10) or some other value greater than one (1), for the TTL configuration parameter. The drone discovery processor 225 then invokes the example short-range transceiver 210 to broadcast the drone discovery message, with the appropriately configured TTL parameter (and/or other configuration parameters), for receipt by any neighboring drone(s).

The example drone discovery processor 225 of FIG. 2 also decodes and processes drone discovery messages received via the short-range transceiver 210 from other drones (e.g., such as one or more of the example drones 105B-D). In the illustrated example of FIG. 2, the drone discovery processor 225 decodes discovery information contained in a received drone discovery message and stores, in the example drone storage 235, the decoded discovery information in association with an identifier of the drone that transmitted the discovery message. The example drone storage 235 may be implemented by any number and/or type(s) of storage devices, memories, etc., or combination thereof. For example, the drone storage 235 may be implemented by the example volatile memory 814 and/or the example mass storage device(s) 828 of the example processor system 800 of FIG. 8, which is described in further detail below.

In some examples, when decoding the received drone discovery message, the drone discovery processor 225 evaluates the value of the TTL parameter included in the received drone discovery message. In response to the received TTL parameter having a value greater than one (1), which specifies more than one (1) hop for the TTL parameter, the drone discovery processor 225 decrements the value of the received TTL parameter by one (1), and invokes the example short-range transceiver 210 to re-broadcast the received drone discovery message, but with the updated value of the TTL parameter. However, if the received TTL parameter has a value equal to one (1), which specifies one hop for the TTL parameter, the drone discovery processor 225 discards the received drone discovery message after storing its contents in the drone storage 235.

An example drone discovery table 300 implemented by the example drone discovery processor 225 of the example drone processing unit 200 of FIG. 2 to store and update drone discovery information in the example drone storage 235 is illustrated in FIG. 3. The example drone discovery table 300 of FIG. 3 includes example entries 305A-C to store respective drone discovery information received by the drone 105A in drone discovery messages broadcast by other drones, such as the one or more of the example drones 105B-D. For example, the table 300 includes an example entry 305A containing discovery information included in a received drone discovery message that was originally broadcast by the example drone 105B. The example table 300 also includes an example entry 305B containing discovery information included in a received drone discovery message that was originally broadcast by the example drone 105C, and an example entry 305C containing discovery information included in a received drone discovery message that was originally broadcast by the example drone 105D. In some examples, the table 300 further includes an example entry (not shown) containing the discovery information associated with drone 105A, and which is to be included in drone discovery messages prepared by the drone discovery processor 225 for broadcast by the drone 105A.

The table 300 of the illustrated example also includes example columns 310-340 to store different data elements included in the drone discovery information for the drones associated with different table entries (e.g., the table entries 305A-C). For example, the table 300 includes an example identify column 310 to store drone identifiers included in the drone discovery information received for the drones represented in the table 300. The drone identifiers allow the received drone information to be associated with the correct drone. The example table 300 includes an example classification column 315 to store drone classification information and/or other information describing the drone's capabilities, features, etc., included in the drone discovery information received for the drones represented in the table 300. The example table 300 includes an example global position system (GPS) data column 320 to store GPS coordinates and/or other current location data included in the drone discovery information received for the drones represented in the table 300. The example table 300 includes an example origin location column 325 and an example destination column 330 to store origination and destination travel corridor locations (e.g., defining a present travel corridor along a programmed flight path) included in the drone discovery information received for the drones represented in the table 300. The example table 300 includes an example signal strength column 335 to store measured signal strengths for the drone discovery messages received for the drones represented in the table 300.

In some examples, the table 300 includes an example status column 340 to allow the drone discovery processor 225 to maintain and update a status indicator for each drone represented in the table 300. For example, after receiving a drone discovery message for another drone, such as the drone 105B, the drone discovery processor 225 sets a status identifier for that drone to a first value to indicate the drone is active. The drone discovery processor 225 then stores this status identifier with the other drone discovery data elements stored for that drone (e.g., such as in the status column 340 for the entry 305A). If the drone discovery processor 225 receives a subsequent drone discovery message for that same drone within a specified or otherwise configured activity time interval, the drone discovery processor 225 maintains the status identifier for that drone as active. However, if the drone discovery processor 225 does not receive a subsequent drone discovery message for that same drone within the specified or otherwise configured activity time interval, the drone discovery processor 225 changes the status identifier for that drone to a second value to indicate the drone is inactive (e.g., such as in the status column 340 for the entry 305B).

Returning to FIG. 2, the example drone processing unit 200 illustrated therein includes the example drone status reporter 230 to report the drone discovery information stored in the example drone discovery table 300 being maintained in the example storage 235. In the illustrated example of FIG. 2, the drone status reporter 230 reports the drone discovery information stored in the drone discovery table 300 to the control center 110 via the mobility network 120. As such, the drone status reporter 230 prepares one or more reporting messages to convey a status report containing the drone discovery information from the table 300 and invokes the example long-range transceiver 205 to transmit the reporting messages to the control center 110 via the mobility network 120.

In some examples, the drone status reporter 230 evaluates whether the drone 105A is in communication with the command center 110 via the mobility network 120 before reporting the drone discovery information stored in the table 300. For example, the drone status reporter 230 detects whether the drone 105A is in communication with the command center 110 via the mobility network 120 by invoking the long-range transceiver 205. In some such examples, the drone status reporter 230 determines the drone 105A is in communication with the command center 110 via the mobility network 120 if the long-range transceiver 205 indicates that it is connected to, or in range of, the mobility network 120. However, if the long-range transceiver 205 indicates that it is not connected to, or is out of range of, the mobility network 120, the drone status reporter 230 determines the drone 105A is in not communication with the command center 110 via the mobility network 120.

In response to determining the drone 105A is in communication with the command center 110 via mobility network 120, the drone status reporter 230 prepares a drone reporting message including the drone discovery information stored in the table 300, and invokes the example long-range transceiver 205 to transmit the reporting message to the command center 110 via the mobility network 120. However, in response to determining the drone 105A is not in communication with the command center 110 via the mobility network 120, the drone status reporter 230 retains the drone discovery information in the table 300 stored in the example drone storage 235 (which is stored in association with the respective drone identifiers) for possible later reporting (e.g., when connectivity with the mobility network is restored).

The drone discovery information stored in the example table 300 and reported to the command center 110 enables the command center 110 to create a map, chart and/or other representation of the deployed drones in the environment of use 100, which can include their current locations, projected flight paths, status, classifications, etc. The command center 110 can also use this information to monitor the deployed drones on, for example, the map, and obtain notification updates (e.g., in real-time) of changes to the drones' operation, such as a flight path alteration, a drone becoming inactive (e.g., which may be indicative of a mishap), etc. Because the drone discovery information can be obtained via multi-hop re-broadcasts as disclosed above, the drone discovery information can be maintained up-to-date even for drones that are outside the coverage area of the mobility network 120. If a drone is lost, the most recent drone discovery information obtained for that drone can be used to identify the drone's last known location, which can assist in drone recovery efforts.

In some examples, the command center 110 uses the reported drone discovery information to determine the projected flight paths for the deployed drones and to monitor the environment (e.g., weather, turbulence, etc.) along the projected flight paths. The command center 110 can then dynamically re-compute flight paths as appropriate (e.g., to avoid areas of high turbulence, inclement weather, etc.) and transmit appropriate control commands to the affected drones to update their flight paths accordingly.

In some examples, the command center 110 uses the reported drone discovery information to organize the deployed drones into appropriate groupings (e.g., based on classification, current location, etc.) to serve a specific customer or group of customers. Additionally or alternatively, the command center 110 can use the reported drone discovery information to select a particular drone to provide a particular service at a particular location.

While an example manner of implementing the drone processing unit 200 is illustrated in FIG. 2, one or more of the elements, processes and/or devices illustrated in FIG. 2 may be combined, divided, re-arranged, omitted, eliminated and/or implemented in any other way. Further, the example long-range transceiver 205, the example short-range transceiver 210, the example mobility controller 215, the example payload controller 220, the example drone discovery processor 225, the example drone status reporter 230, the example drone storage 235 and/or, more generally, the example drone processing unit 200 of FIG. 2 may be implemented by hardware, software, firmware and/or any combination of hardware, software and/or firmware. Thus, for example, any of the example long-range transceiver 205, the example short-range transceiver 210, the example mobility controller 215, the example payload controller 220, the example drone discovery processor 225, the example drone status reporter 230, the example drone storage 235 and/or, more generally, the example drone processing unit 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example drone processing unit 200, the example long-range transceiver 205, the example short-range transceiver 210, the example mobility controller 215, the example payload controller 220, the example drone discovery processor 225, the example drone status reporter 230 and/or the example drone storage 235 is/are hereby expressly defined to include a tangible computer readable storage device or storage disk such as a memory, a digital versatile disk (DVD), a compact disk (CD), a Blu-ray disk, etc. storing the software and/or firmware. Further still, the example drone processing unit 200 of FIG. 2 may include one or more elements, processes and/or devices in addition to, or instead of, those illustrated in FIG. 2, and/or may include more than one of any or all of the illustrated elements, processes and devices.

Figure 4:
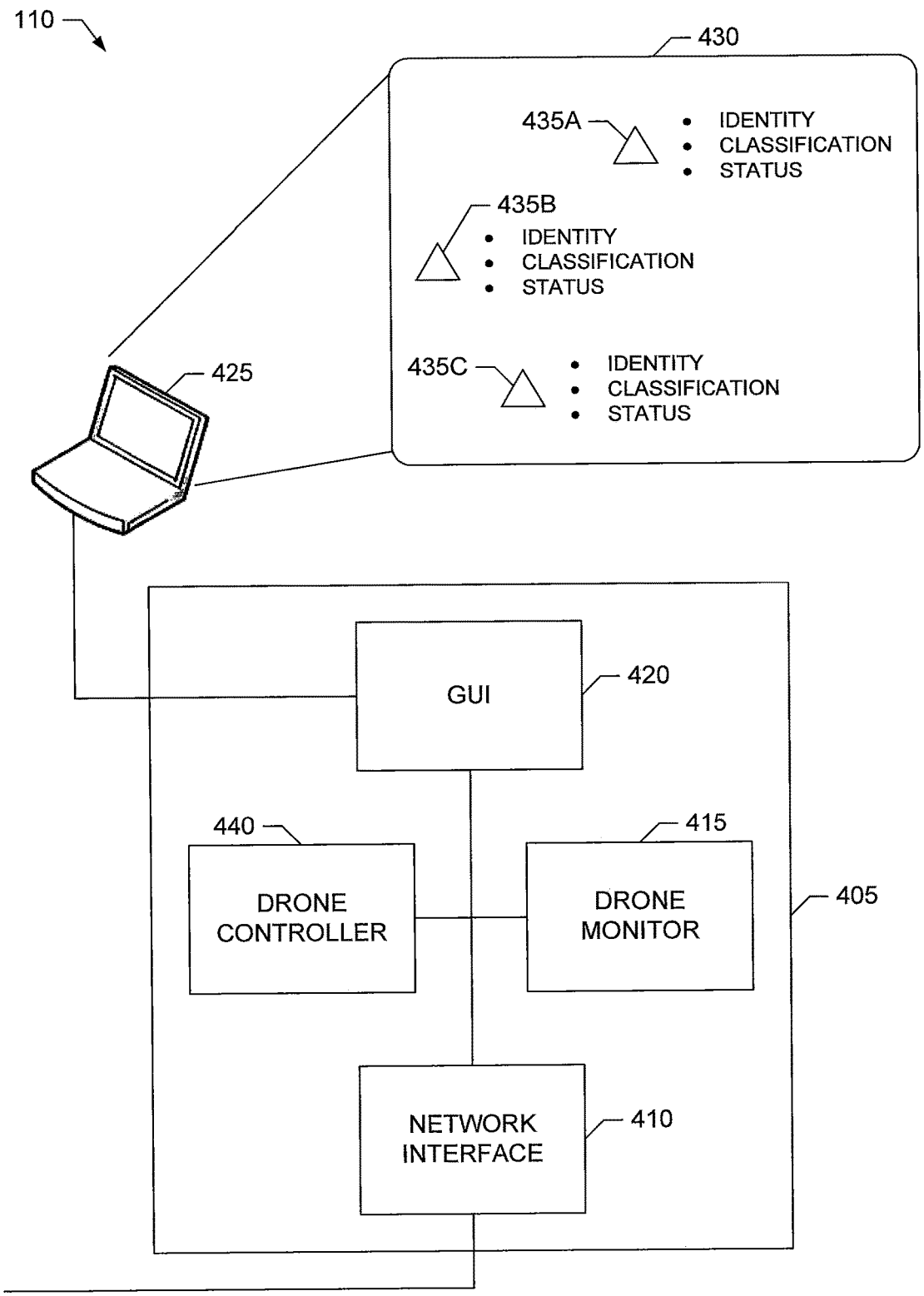
FIG. 4 is a block diagram of an example implementation of the example command center illustrated in FIG. 1.

An example implementation of the command center 110 of FIG. 1 is illustrated in FIG. 4. The example command center 110 includes an example drone manager 405, which further includes an example network interface 410 to communicate with one or more communication networks, links, etc., to interface the command center 110 with the example mobility network 120. For example, the network interface 305 can be implemented by any type(s), number(s) and/or combination(s) of interfaces, such as the example interface circuit 920 of FIG. 9, which is described in further detail below.

The example drone manager 405 also includes an example drone monitor 415 to receive reporting messages conveying drone status reports from deployed drones, such as the drones 105A-D. For example, and as described above, a drone status report received from the drone 105A may include first drone discovery information for the drone 105A, and second drone discovery information for another drone, such as the drone 105B, for which a broadcasted drone discovery message was received. The drone status report received from the drone 105A may further include respective drone discovery information for other drones for which broadcasted drone discovery messages were received.

In some disclosed examples, the drone monitor 415 utilizes an example graphical user interface (GUI) 420 to present the drone discovery information included in received status reports on a display of an example computing device 425. The example computing device 425 can be implemented by any number and/or type(s) of computing devices, such as one or more computers, terminals, tablets, mobile devices, etc. In the illustrated example of FIG. 4, the drone monitor 415 combines the drone discovery information included in different received status reports and uses the GUI 420 to present the different drone discovery information for different drones in association with the respective identifiers for the different drones.

For example, the GUI 420 can be configured to generate an example map 430 on the display of the example computing device 425. In the illustrated example of FIG. 4, the map 430 generated by the GUI 420 includes respective example icons 435A-C corresponding to respective different drones represented in the reported drone discovery information received by the drone monitor 415. Each one of the icons 435A-C displayed in the example map 430 is labeled with an identifier identifying its respective drone, and is positioned on the map at a respective map location corresponding to the current location for its respective drone. As described above, the drone identifiers and current locations are included in the drone discovery information reported for the different drones. In some examples, the GUI 420 also displays the travel corridors for the different drones being presented on the example map 430. For example, the travel corridor for a given deployed drone displayed on the map 430 can be determined from the origination and destination locations included in the reported discovery information for that drone. Additionally or alternatively, the GUI 420 can display classification and/or status data obtained from the received discovery information for the different drones in association with the respective drone icons 435A-C being presented on the map 430.

The example drone manager 405 also includes an example drone controller 440 to prepare and transmit commands (e.g., via the network interface 410) to deployed drones being managed by the command center 110. For example, the drone controller 440 may receive user inputs from the computing device 425 via the GUI 420. The drone controller 440 then prepares command messages based on these user inputs, and invokes the network interface 410 to send the command messages to the deployed drone to be controlled. In some examples, the drone controller 440 includes a drone identifier identifying the destination drone for a transmitted command message. In some examples, if the destination drone is not in communication with the command center 110 via the mobility network 120, the drone controller 440 sends a command message destined for that destination drone to another drone that reported (e.g., most recently) drone discovery information for the destination drone. This other drone will then receive the command message and re-broadcast it for receipt by the destination drone (e.g., directly, or indirectly via one or more intermediate drones), as disclosed above.

While an example manner of implementing the command center 110 of FIG. 1 is illustrated in FIG. 4, one or more of the elements, processes and/or devices illustrated in FIG. 4 may be combined, divided, re-arranged, omitted, eliminated and/or implemented in any other way. Further, the example drone manager 405, the example network interface 410, the example drone monitor 415, the example GUI 420, the example computing device 425, the example drone controller 440 and/or, more generally, the example command center 110 of FIG. 4 may be implemented by hardware, software, firmware and/or any combination of hardware, software and/or firmware. Thus, for example, any of the example drone manager 405, the example network interface 410, the example drone monitor 415, the example GUI 420, the example computing device 425, the example drone controller 440 and/or, more generally, the example command center 110 could be implemented by one or more analog or digital circuit(s), logic circuits, programmable processor(s), ASIC(s), PLD(s) and/or FPLD(s). When reading any of the apparatus or system claims of this patent to cover a purely software and/or firmware implementation, at least one of the example command center 110, the example drone manager 405, the example network interface 410, the example drone monitor 415, the example GUI 420, the example computing device 425 and/or the example drone controller 440 is/are hereby expressly defined to include a tangible computer readable storage device or storage disk such as a memory, a DVD, a CD, a Blu-ray disk, etc. storing the software and/or firmware. Further still, the example command center 110 of FIG. 1 may include one or more elements, processes and/or devices in addition to, or instead of, those illustrated in FIG. 4, and/or may include more than one of any or all of the illustrated elements, processes and devices.

Flowcharts representative of example machine readable instructions for implementing the example drone processing unit 200, the example long-range transceiver 205, the example short-range transceiver 210, the example mobility controller 215, the example payload controller 220, the example drone discovery processor 225, the example drone status reporter 230, the example drone storage 235, the example command center 110, the example drone manager 405, the example network interface 410, the example drone monitor 415, the example GUI 420, the example computing device 425 and/or the example drone controller 440 are shown in FIGS. 5A-B, 6 and 7. In these examples, the machine readable instructions comprise one or more programs for execution by a processor, such as the processor 812 and/or 912 shown in the example processor platforms 800 and 900 discussed below in connection with FIGS. 8-9. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processors 812 and/or 912, but the entire program or programs and/or portions thereof could alternatively be executed by a device other than the processors 812 and/or 912, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 5A-B, 6 and 7, many other methods of implementing the example drone processing unit 200, the example long-range transceiver 205, the example short-range transceiver 210, the example mobility controller 215, the example payload controller 220, the example drone discovery processor 225, the example drone status reporter 230, the example drone storage 235, the example command center 110, the example drone manager 405, the example network interface 410, the example drone monitor 415, the example GUI 420, the example computing device 425 and/or the example drone controller 440 may alternatively be used. For example, with reference to the flowcharts illustrated in FIGS. 5A-B, 6 and 7, the order of execution of the blocks may be changed, and/or some of the blocks described may be changed, eliminated, combined and/or subdivided into multiple blocks.

As mentioned above, the example processes of FIGS. 5A-B, 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5A-B, 6 and 7 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

Figure 5A:
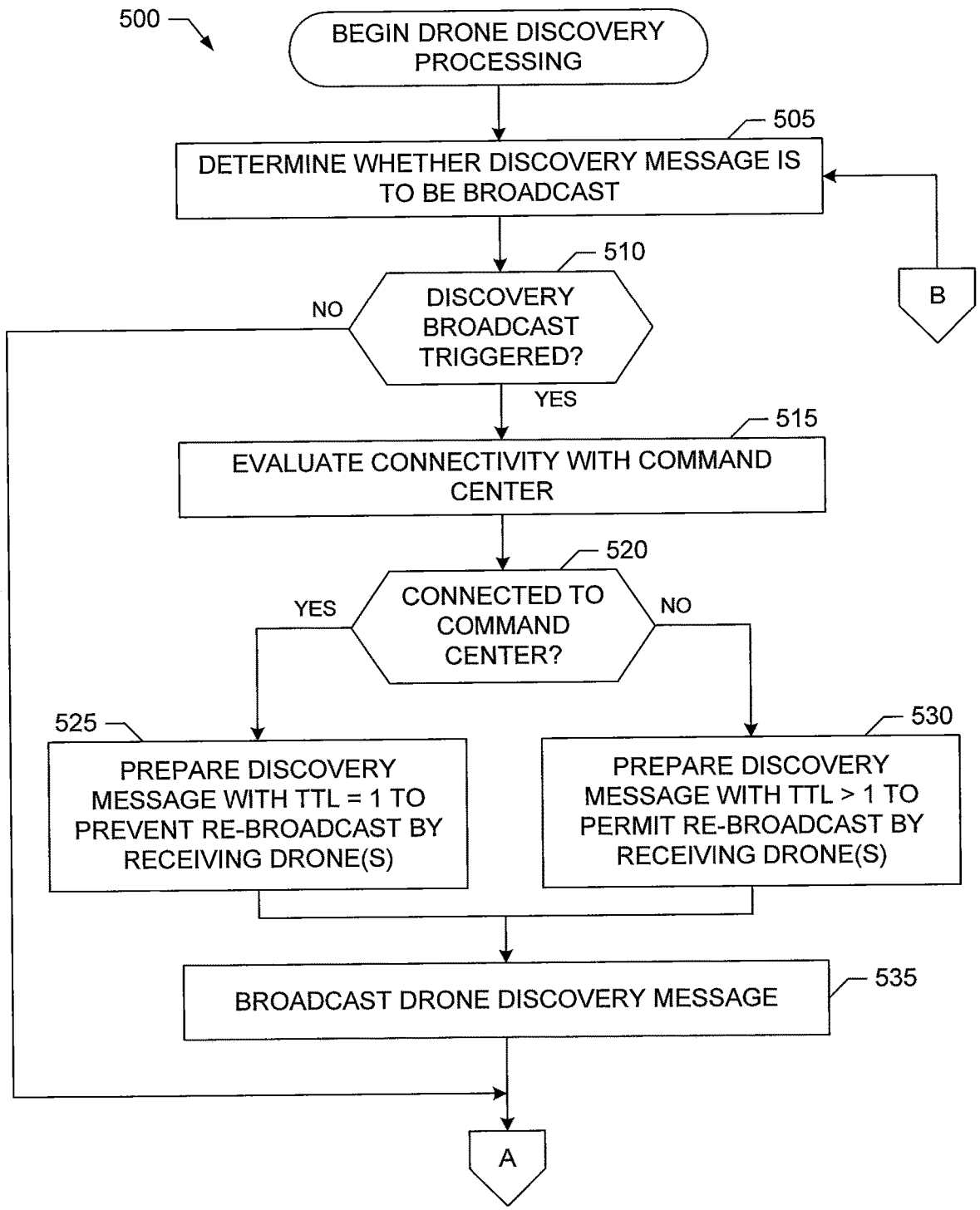
FIGS. 5A-B collectively form a flowchart representative of example machine readable instructions that may be executed to implement drone discovery aspects of the example drone processing unit of FIG. 2.
Figure 5B:
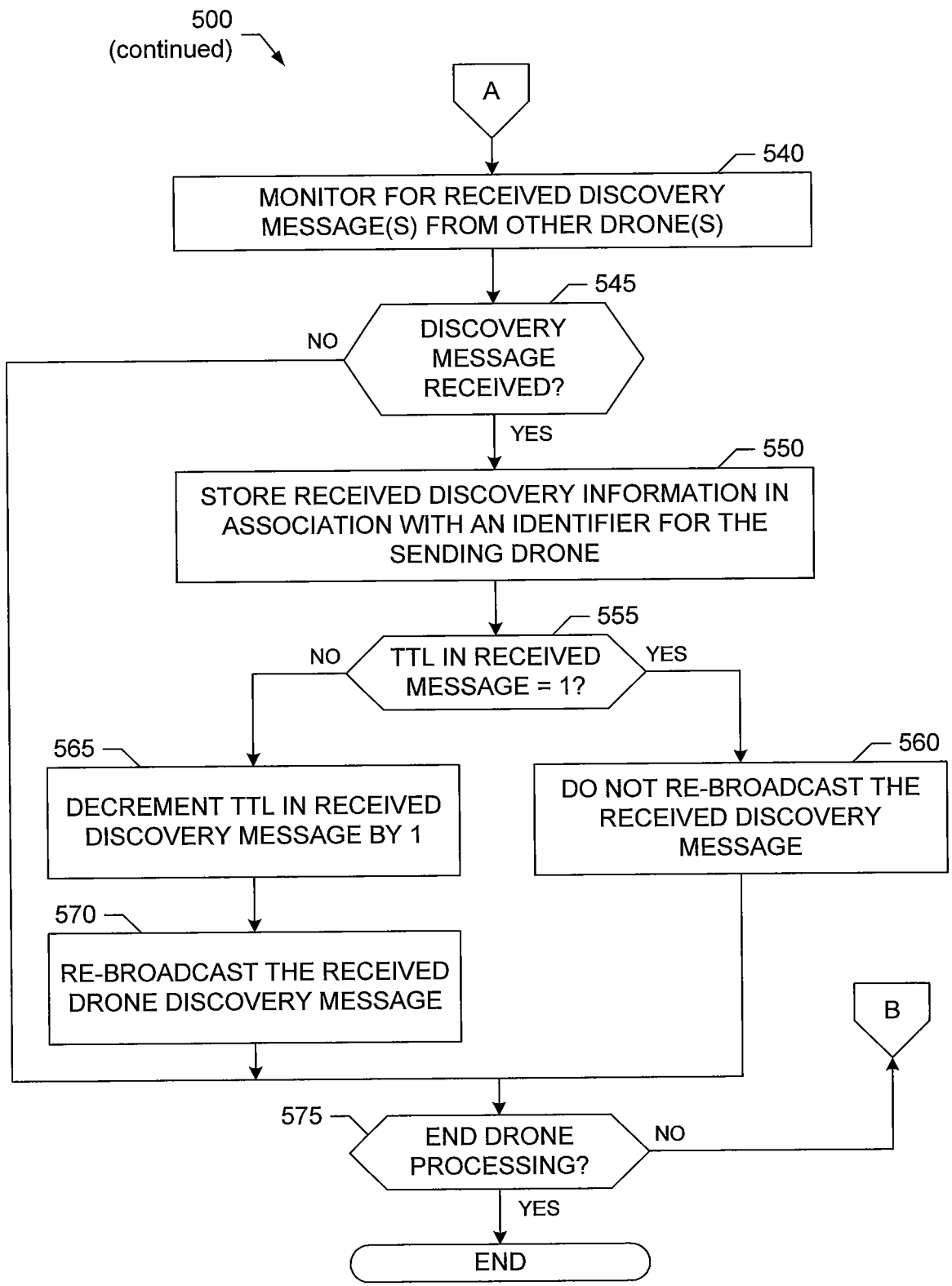

A first example program 500 that may be executed to implement the example drone processing unit 200 of FIG. 2 is represented by the flowchart shown in FIGS. 5A-B. The first example program 500 implements drone discovery processing for the example drone processing unit 200. For convenience, and without loss of generality, execution of the example program 500 is described from the perspective of the example drone processing unit 200 being used to implement the example drone 105A. With reference to the preceding figures and associated written descriptions, the example program 500 of FIGS. 5A-B begins execution at block 505 of FIG. 5A at which the example drone discovery processor 225 of the drone processing unit 200 determines whether a drone discovery message containing drone discovery information associated with the drone 105A is to be broadcast by the drone 105A. In some examples, the drone 105A is to broadcast a drone discovery message in response to one or more discovery advertisement triggers being met, asserted, etc. For example, the broadcast of drone discovery messages may be triggered by the drone discovery processor 225 periodically (e.g., according to one or more discovery broadcasting intervals), in response to one or more events, etc., or any combination thereof.

In some examples, the drone discovery processor 225 triggers the broadcast of drone discovery messages periodically based on a first (e.g., longer) discovery broadcasting interval (e.g., such as a 1 minute interval, a 5 minute interval, etc.) when the drone 105A is in communication with the command center 110 via the mobility network 120 (e.g., when the example long-range transceiver 205 of the drone processing unit 200 is in communication with, or in range of, the mobility network 120). However, when the drone 105A is not in communication with the command center 110 via the mobility network 120 (e.g., when the example long-range transceiver 205 of the drone processing unit 200 is not in communication with, or is out of range of, the mobility network 120), the drone discovery processor 225 triggers the broadcast of drone discovery messages periodically based on a second (e.g., shorter) discovery broadcasting interval (e.g., such as a 15 second interval, a 30 second interval, etc.). Additionally or alternatively, in some examples, the drone discovery processor 225 triggers the broadcast of drone discovery messages based on the occurrence of one or more events, such as, but not limited to, events corresponding to (1) the drone discovery processor 225 detecting a transition from the drone 105A being in communication with to not being in communication with the command center 110 via the mobility network 120, and/or vice versa, (2) the drone discovery processor 225 detecting receipt of a drone discovery message broadcast by another drone, (3) the payload unit of the drone 105A sensing one or more weather conditions, (4) an operational alarm being triggered by the drone 105A (e.g., such as a low power alarm, an equipment failure, etc.), etc., or any combination thereof.

If the drone discovery processor 225 detects that a discovery broadcast has been triggered (block 510), processing proceeds to block 515 at which the drone discovery processor 225 detects, as described above, whether the drone 105A is in communication with the command center 110 via the mobility network 120. If the drone 105A is in communication with the command center 110 via the mobility network 120 (block 520), then at block 525 the drone discovery processor 225 configures a drone discovery message, which contains the drone discovery information associated with the drone 105A, to have a first value, such as a value of one (1), for the TTL configuration parameter. However, if the drone 105A is not in communication with the command center 110 via mobility network 120 (block 520), then at block 530 the drone discovery processor 225 configures the drone discovery message, which contains the drone discovery information associated with the drone 105A, to have a second value different from the first value, such as a value of ten (10) or some other value greater than one (1), for the TTL configuration parameter. Then, at block 535, the drone discovery processor 225 invokes the example short-range transceiver 210 of the drone processing unit 200 to broadcast the drone discovery message, with the appropriately configured TTL parameter, for receipt by any neighboring drone(s).

At block 540 of FIG. 5B, the drone discovery processor 225 monitors for drone discovery messages received from other drones. If a drone discovery message is received from another drone, such as the drone 105C (block 545), at block 550 the drone discovery processor 225 decodes the discovery information contained in the received drone discovery message and stores the decoded discovery information in association with an identifier of the drone that transmitted the discovery message (e.g., the drone 105B). For example, and as described above, the drone discovery processor 225 may obtain the drone identifier as one of the data elements included the received drone discovery information, and may store the drone discovery information in the example table 300 maintained in the example drone storage 235 of the drone processing unit 200.

At block 555, the drone discovery processor 225 evaluates the TTL parameter included in the received drone discovery message. If the value of the TTL parameter is one (1) (block 555), then at block 560 the drone discovery processor 225 does not re-broadcast the received drone discovery message (e.g., and discards the message). However, if the value of the TTL parameter is greater than one (1) (block 555), then at block 565 the drone discovery processor 225 decrements the value of the received TTL parameter by one (1). At block 570, the drone discovery processor 225 invokes the example short-range transceiver 210 of the drone processing unit 200 to re-broadcast the received drone discovery message. At block 575, the drone discovery processor 225 determines whether drone processing is to end (e.g., such as when the drone 105A returns to its staging area). If drone processing is to continue (block 575), the processing returns to block 505 of FIG. 5A and blocks subsequent thereto to continue execution of the example program 500. However, if drone processing is to end (block 575), execution of the example program 500 ends.

Figure 6:
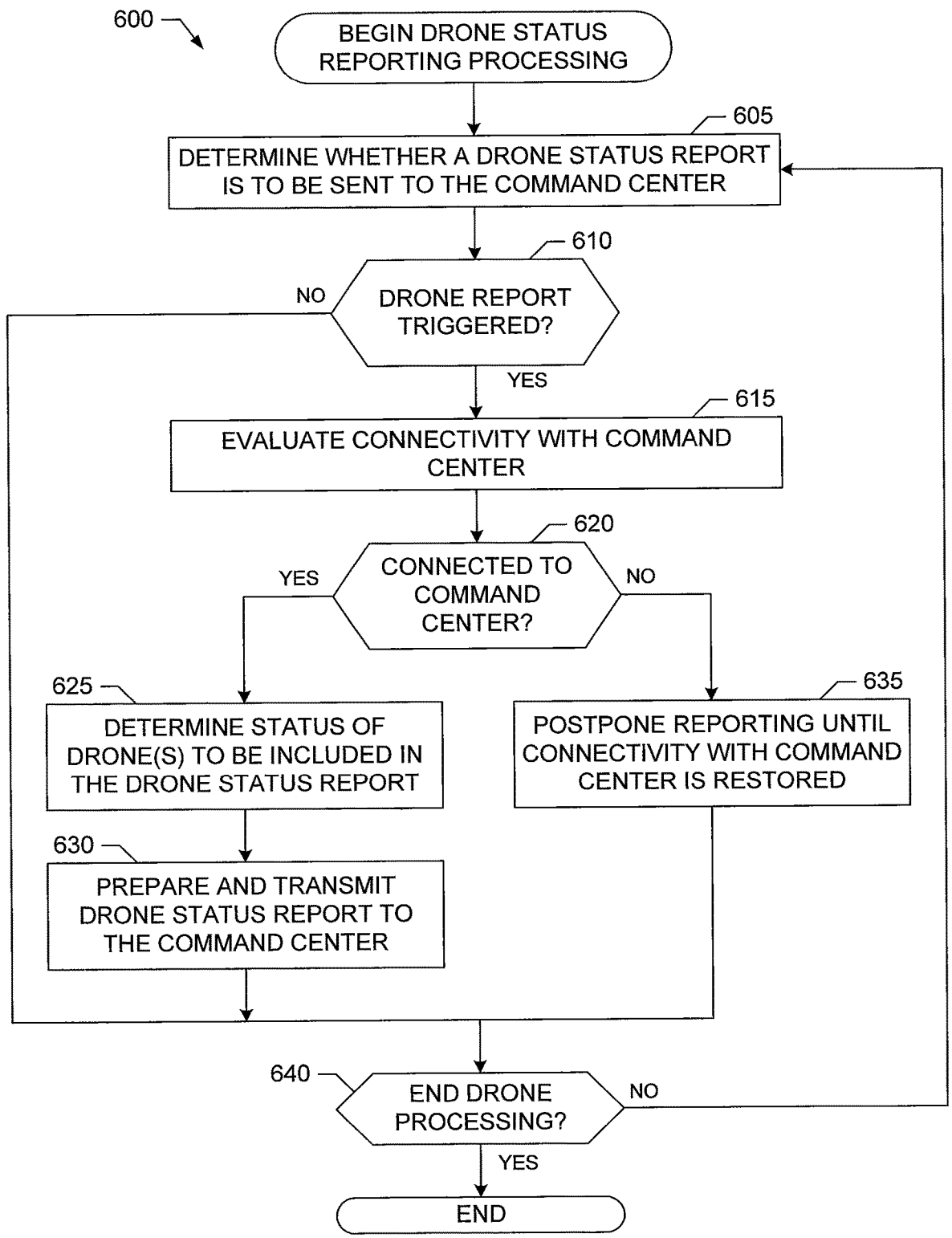
FIG. 6 is a flowchart representative of example machine readable instructions that may be executed to implement drone status reporting aspects of the example drone processing unit of FIG. 2.

A second example program 600 that may be executed to implement the example drone processing unit 200 of FIG. 2 is represented by the flowchart shown in FIG. 6. The second example program 600 implements drone status reporting for the example drone processing unit 200. The second example program 600 can be executed in parallel with, sequential to or separately from the first example program 500 of FIG. 5. For convenience, and without loss of generality, execution of the example program 600 is described from the perspective of the example drone processing unit 200 being used to implement the example drone 105A. With reference to the preceding figures and associated written descriptions, the example program 600 of FIG. 6 begins execution at block 605 at which the example drone status reporter 230 of the drone processing unit 200 determines whether a drone status reporting message containing drone discovery information associated with the drone 105A and other drones (e.g., the drones 105B, 105C and/or 105D) is to be reported to the command center 110. In some examples, the drone 105A is to report a drone status reporting message in response to one or more reporting triggers being met, asserted, etc. For example, the transmission of drone status reporting messages may be triggered by the drone status reporter 230 periodically (e.g., according to one or more reporting intervals), in response to one or more events, etc., or any combination thereof.

In some examples, the drone status reporter 230 triggers the transmission of drone status reporting messages periodically based on a drone reporting interval (e.g., such as a 1 minute interval, a 5 minute interval, etc.). Additionally or alternatively, in some examples, the drone status reporter 230 triggers the transmission of drone status reporting messages based on the occurrence of one or more events, such as, but not limited to, events corresponding to (1) the drone status reporter 230 detecting a transition from the drone 105A being out of communication with to being in communication with the command center 110 via the mobility network 120, (2) the drone status reporter 230 detecting receipt of a drone discovery message broadcast by another drone, (3) the payload unit of the drone 105A sensing one or more weather conditions, (4) an operational alarm being triggered by the drone 105A (e.g., such as a low power alarm, an equipment failure, etc.), etc., or any combination thereof.

If the drone status reporter 230 detects that a status report has been triggered (block 610), processing proceeds to block 615 at which the drone status reporter 230 detects, as described above, whether the drone 105A is in communication with the command center 110 via the mobility network 120. If the drone 105A is in communication with the command center 110 via the mobility network 120 (block 620), then at block 625 the drone status reporter 230 evaluates the status of the drones to be included in the drone status report. For example, and as described above, the drone status reporter 230 may set the respective status for each drone maintained in the example table 300 of FIG. 3 to be active or inactive depending on whether a drone discovery message has been received for that drone within an activity time interval. At block 630, the drone status reporter 230 prepares a drone status reporting message (e.g., based on the drone discovery information stored in the example table 300), and invokes the example long-range transceiver 205 of the drone processing unit 200 to transmit the reporting message to the command center 110 via the mobility network 120, as described above.

However, if the drone 105A is not in communication with the command center 110 via the mobility network 120 (block 620), then at block 635 the drone status reporter 230 postpones status reporting (e.g., until connectivity with the command center via the mobility network 120 is restored). At block 640, the drone status reporter 230 determines whether drone processing is to end (e.g., such as when the drone 105A returns to its staging area). If drone processing is to continue (block 640), the processing returns to block 605 and blocks subsequent thereto to continue execution of the example program 600. However, if drone processing is to end (block 640), execution of the example program 600 ends.

Figure 7:
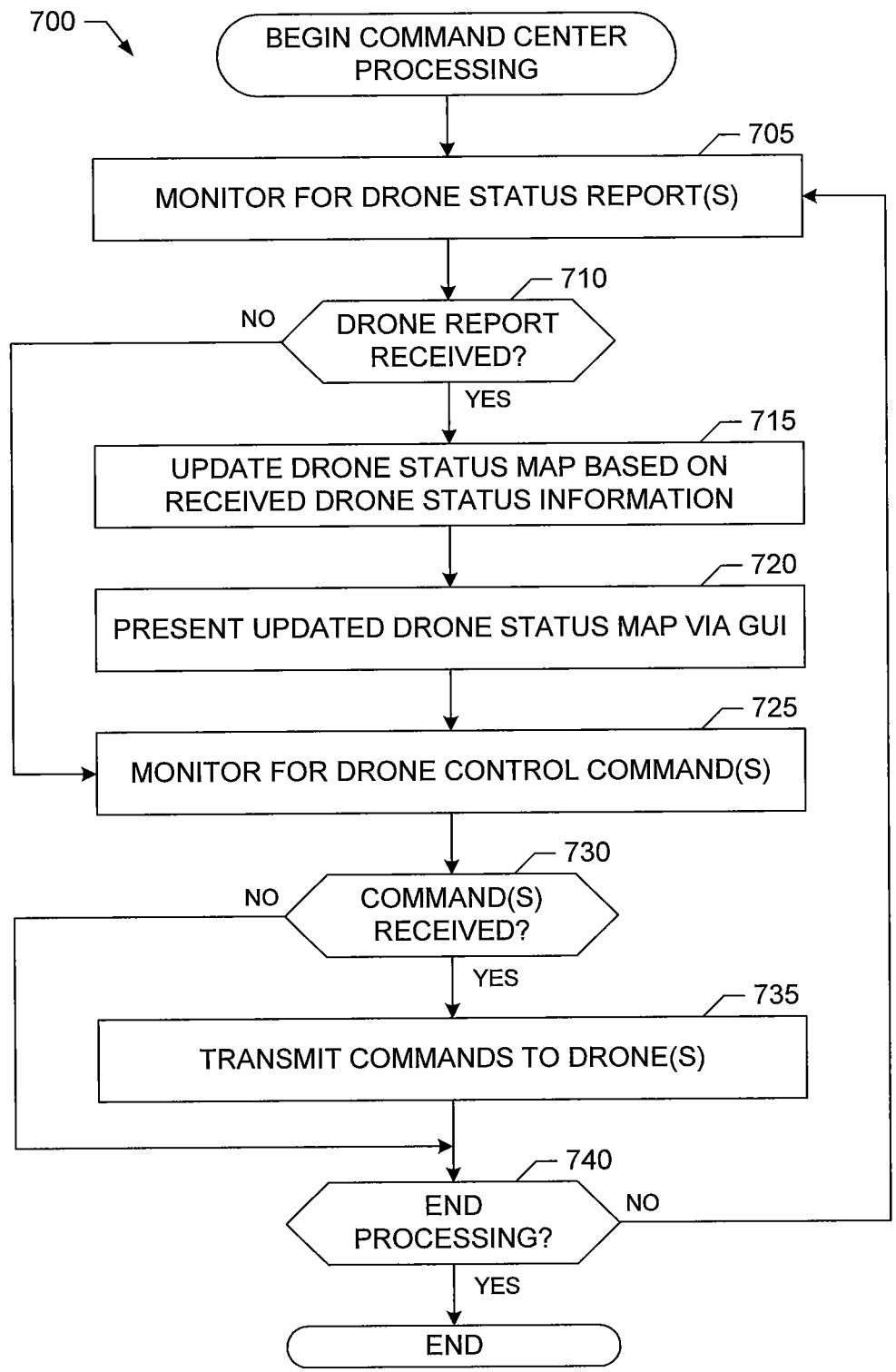
FIG. 7 is a flowchart representative of example machine readable instructions that may be executed to implement the example command center of FIGS. 1 and/or 4.

An example program 700 that may be executed to implement the example command center 110 of FIGS. 1 and/or 4 is represented by the flowchart shown in FIG. 7. With reference to the preceding figures and associated written descriptions, the example program 700 of FIG. 7 begins execution at block 705 at which the example drone monitor 415 of the example drone manager 405 included in the command center 110 monitors for drone status reporting messages received from deployed drone being managed by the command center 110. If a drone status report is received (block 710), at block 715 the drone monitor 415 prepares and/or updates the example drone status map 430 based on the received drone status information (e.g., including reported drone discovery information, drone status, etc.), as described above. At block 720, the drone monitor 415 invokes the example GUI 420 of the drone manager 405 to present the updated drone status map 430 on the display of the example computing device 425.

At block 725, the example drone controller 440 of the drone manager 405 monitors for drone control commands input from, for example, the computing device 425 via the GUI 420. If drone control commands are received (block 730), at block 735 the drone controller 440 prepares command message(s) to send to the appropriate drone(s) to control operation of the drone(s) according to the received drone control commands. At block 735, the drone controller 440 also invokes the network interface 410 of the drone manager 405 to transmit the command message(s) to the appropriate drone(s), as disclosed above.

At block 740, the drone manager 405 determines whether processing is to end (e.g., based on a power-down command, a re-start command, etc.). If processing is to continue (block 740), the processing returns to block 705 and blocks subsequent thereto to continue execution of the example program 700. However, if processing is to end (block 740), execution of the example program 700 ends.

Figure 8:
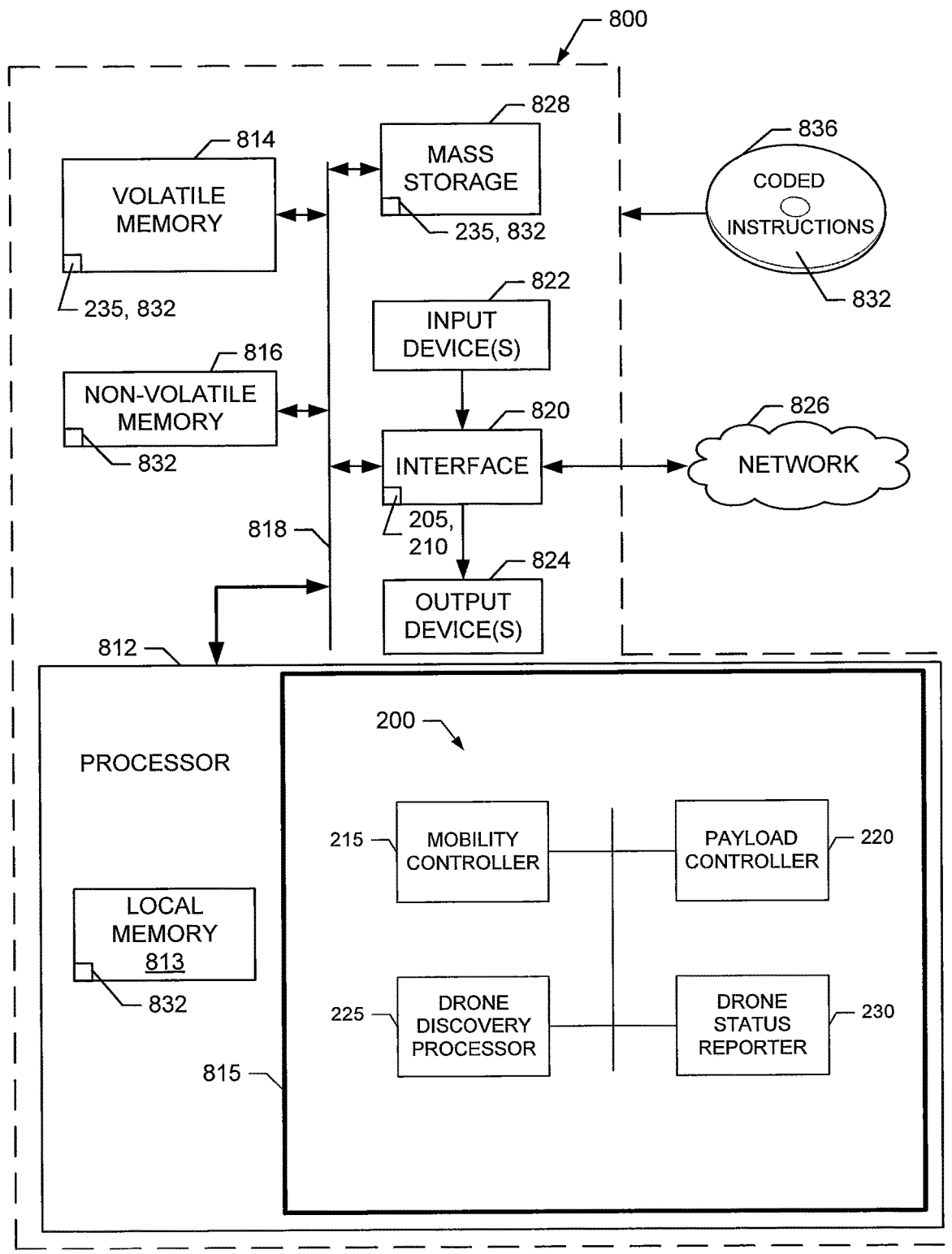
FIG. 8 is a block diagram of an example processor platform structured to execute the example machine readable instructions of FIGS. 5A-B and/or 6 to implement the example drone processing unit of FIG. 2.

FIG. 8 is a block diagram of an example processor platform 800 capable of executing the instructions of FIGS. 5A-B and/or 6 to implement the example drone processing unit 200 of FIG. 2. The processor platform 800 can be, for example, any type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 includes one or more example processing cores 815 configured via example instructions 832, which include the example instructions of FIGS. 5A-B and/or 6, to implement the example mobility controller 215, the example payload controller 220, the example drone discovery processor 225 and/or the example drone status reporter 230 of FIG. 2.

The processor 812 of the illustrated example includes a local memory 813 (e.g., a cache). The processor 812 of the illustrated example is in communication with a main memory including a volatile memory 814 and a non-volatile memory 816 via a link 818. The link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a voice recognition system, a keypad, etc. Also, many systems, such as the processor platform 800, can allow the user to control the computer system and provide data to the computer using physical gestures, such as, but not limited to, hand or body movements, facial expressions, and face recognition.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display and/or speakers. The interface circuit 820 of the illustrated example, thus, may include a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826. In the illustrated example of FIG. 8, the interface circuit 820 is also structured to implement the example long-range transceiver 205 and/or the example short-range transceiver 210 of FIG. 2.

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID (redundant array of independent disks) systems, digital versatile disk (DVD) drives, solid state memories, etc. In some examples, the mass storage device 828 may implement the example drone storage 235 of FIG. 2. Additionally or alternatively, in some examples the volatile memory 814 may implement the example drone storage 235 of FIG. 2.

Coded instructions 832 corresponding to the instructions of FIGS. 5A-B and/or 6 may be stored in the mass storage device 828, in the volatile memory 814, in the non-volatile memory 816, in the local memory 813 and/or on a removable tangible computer readable storage medium, such as a CD or DVD 836.

Figure 9:
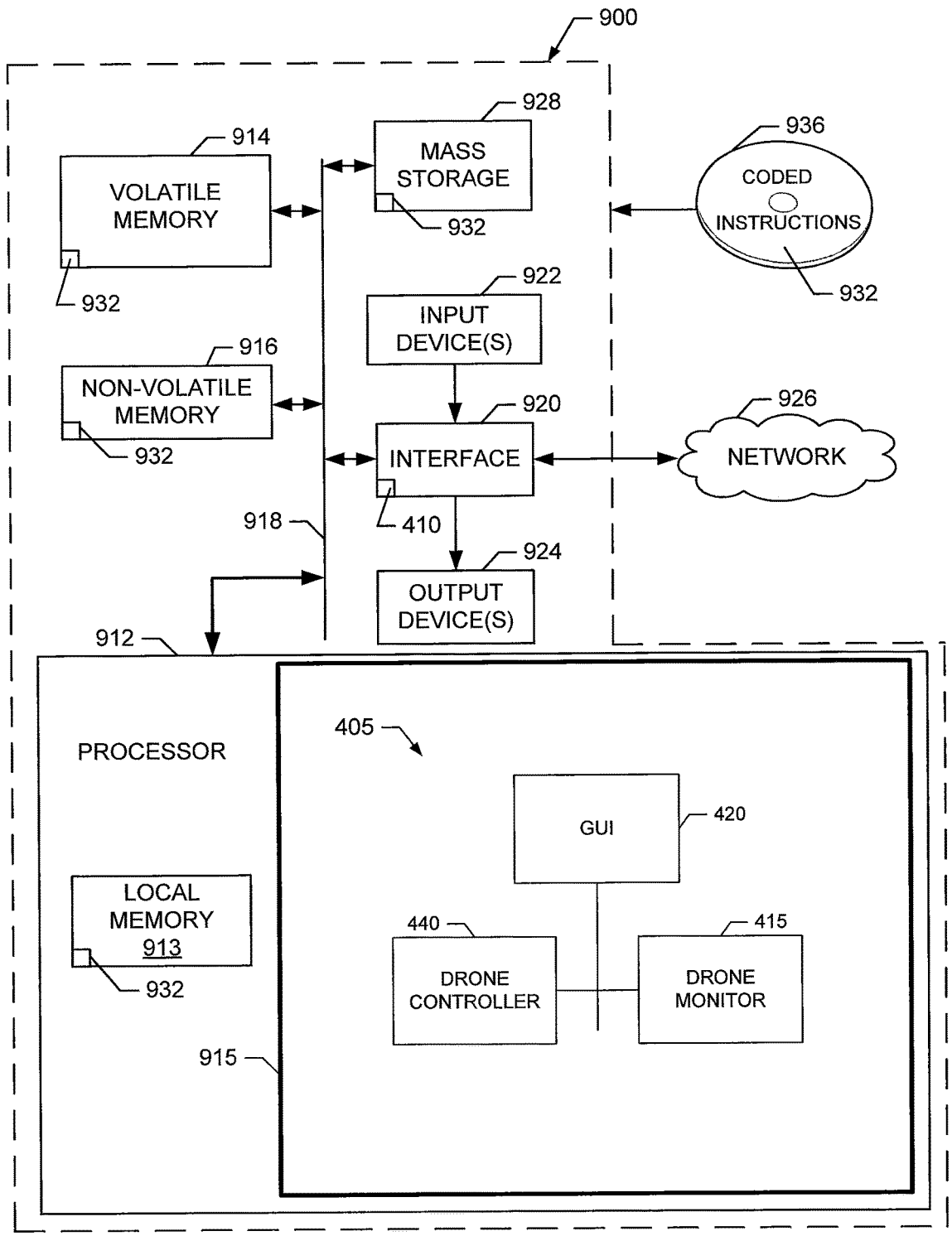
FIG. 9 is a block diagram of an example processor platform structured to execute the example machine readable instructions of FIG. 7 to implement the example command center of FIGS. 1 and/or 4.

FIG. 9 is a block diagram of an example processor platform 900 capable of executing the instructions of FIG. 7 to implement the example command center 110 of FIGS. 1 and/or 4. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In the illustrated example of FIG. 9, the processor 912 includes one or more example processing cores 915 configured via example instructions 932, which include the example instructions of FIG. 7, to implement the example drone manager 405, the example drone monitor 415, the example GUI 420 and/or the example drone controller 440 of FIG. 4.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by SDRAM, DRAM, RDRAM and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a USB, and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., an LED, an OLED, a liquid crystal display, a CRT, a touchscreen, a tactile output device, a printer and/or speakers). The interface circuit 920 of the illustrated example, thus, may include a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a DSL, a telephone line, coaxial cable, a cellular telephone system, etc.). In the illustrated example of FIG. 9, the interface circuit 920 is also structured to implement the example network interface 410 of FIG. 4.

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, DVD drives, solid state memories, etc.

Coded instructions 932 corresponding to the instructions of FIG. 7 may be stored in the mass storage device 928, in the volatile memory 914, in the non-volatile memory 916, in the local memory 913 and/or on a removable tangible computer readable storage medium, such as a CD or DVD 936.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

The invention claimed is:

1. A method comprising:
   detecting, by a first vehicle, whether the first vehicle is in communication with a command center via a first communication network;
   determining, by the first vehicle based on the detecting, a configurable first value for a time-to-live parameter of a first message to broadcast first data associated with the first vehicle, wherein the first message comprises the first data and the configurable first value of the time-to-live parameter, and wherein the configurable first value specifies a number of communication hops over which the first message can be re-broadcast;
   determining, by the first vehicle, a periodicity based on the detecting;
   broadcasting, by the first vehicle, a plurality of messages according to the periodicity, wherein the first message is one of the plurality of messages and is receivable by devices within a receiving range of the first vehicle;

receiving, by the first vehicle, a second message comprising:
  second data associated with a second vehicle; and
  a configurable second value for a time-to-live parameter of the second message; and
in response to the configurable second value specifying not to re-broadcast the second message, storing, by the first vehicle, the second data.

2. The method of claim 1, further comprising:
receiving, by the first vehicle, a third message comprising:
  third data associated with a third vehicle; and
  a configurable third value for a time-to-live parameter of the third message; and
in response to the configurable third value specifying more than one hop for the time-to-live parameter of the third:
  adjusting, by the first vehicle, the configurable third value to determine a first value for the time-to-live parameter of the third message; and
  re-broadcasting, by the first vehicle, the third message configured with the first value for the time-to-live parameter of the third message.

3. The method of claim 1, wherein:
the configurable first value is a first value when the first vehicle is detected as being in communication with the command center via the first communication network,
the configurable first value is a second value different from the first value when the first vehicle is detected as not being in communication with the command center via the first communication network,
the first value corresponds to one hop to cause the first message to not be re-broadcast, and
the second value corresponds to greater than one hop to cause the first message to be re-broadcast.

4. The method of claim 1, wherein:
each of the plurality of messages is a discovery message;
the first data comprises an identifier for the first vehicle, an origination location for the first vehicle, a destination location for the first vehicle, a current location of the first vehicle, and environment measurements associated with the first vehicle; and
the origination location and the destination location define a corridor along which the first vehicle is programmed to travel.

5. The method of claim 1, further comprising:
receiving, by the first vehicle, a third message comprising third data associated with a third vehicle; and
in response to detecting the first vehicle is in communication with the command center via the first communication network, reporting, by the first vehicle, the third data in association with the third vehicle to the command center via the first communication network; or
in response to detecting the first vehicle is not in communication with the command center via the first communication network, retaining, by the first vehicle in a memory, the third data in association with the third vehicle.

6. The method of claim 1, further comprising detecting, by the first vehicle, an event, wherein the broadcasting is in response to the detecting the event.

7. The method of claim 6, wherein the detecting the event comprises detecting a transition between the first vehicle being in communication with the command center via the first communication network and not being in communication with the command center via the first communication network.

8. The method of claim 6, wherein the detecting the event comprises detecting data indicative of a remaining power associated with the first vehicle and/or an equipment failure associated with the first vehicle.

9. The method of claim 6, wherein the detecting the event comprises receiving a discovery message from a third vehicle.

10. The method of claim 6, wherein the detecting the event comprises sensing one or more weather conditions.

11. The method of claim 1, wherein the periodicity is a first periodicity when the first vehicle is detected as being in communication with the command center via the first communication network, and wherein the periodicity is a second periodicity shorter than the first periodicity when the first vehicle is detected as not being in communication with the command center via the first communication network.

12. The method of claim 1, further comprising:
in response to the configurable second value specifying not to re-broadcast the second message:
  discarding, by the first vehicle, the second message.

13. A non-transitory machine readable storage medium comprising machine readable instructions which, when executed, cause one or more processors of a first vehicle to perform operations, the operations comprising:
detecting whether the first vehicle is in communication with a command center via a first communication network;
determining, based on the detecting, a configurable first value for a time-to-live parameter of a first message to broadcast first data associated with the first vehicle, wherein the first message comprises the first data and the configurable first value of the time-to-live parameter, and wherein the configurable first value specifies a number of communication hops over which the first message is to be re-broadcast;
determining a periodicity based on the detecting;
broadcasting a plurality of messages according to the periodicity, wherein the first message is one of the plurality of messages and is receivable by devices within a receiving range of the first vehicle;
receiving a second message comprising:
  second data associated with a second vehicle; and
  a configurable second value for a time-to-live parameter of the second message; and
in response to the configurable second value specifying not to re-broadcast the second message, storing the second data.

14. The non-transitory machine readable storage medium of claim 13, wherein the operations further comprise:
receiving a third message comprising third data associated with a third vehicle;
configuring, based on the detecting, the third message with a configurable third value such that the third message comprises the third data and the configurable third value, wherein the configurable third value specifies a number of communication hops over which the third message is to be re-broadcast; and
broadcasting the third message comprising the third data and the configurable third value.

15. The non-transitory machine readable storage medium of claim 14, wherein the configuring comprises:
in response to detecting the first vehicle is in communication with the command center via the first communication network, configuring the third message with a first value as the configurable third value; or
in response to detecting the first vehicle is not in communication with the command center, configuring the third message with a second value as the configurable third value, wherein the second value is different from the first value.

16. The non-transitory machine readable storage medium of claim 14, wherein the third message is received from the command center, and wherein the third data comprises command data for the third vehicle.

17. The non-transitory machine readable storage medium of claim 14, wherein the third message is received from a fourth vehicle.

18. A vehicle comprising:
a non-transitory memory including machine readable instructions; and
one or more hardware processors configured to execute the machine readable instructions to cause the vehicle to perform operations, the operations comprising:
  detecting whether the vehicle is in communication with a command center via a first communication network;
  configuring a first message with a configurable first value for a time-to-live parameter if the vehicle is detected as being in communication with the command center, wherein the first message comprises first data and the time-to-live parameter, or configuring the first message with a configurable second value different from the configurable first value for the time-to-live parameter if the vehicle is detected as not being in communication with the command center;
  determining a periodicity based on the detecting;
  broadcasting a plurality of messages according to the periodicity, wherein the first message comprising the first data and the configurable first value or the configurable second value, wherein the configurable first value or the configurable second value specifies a number of communication hops over which the first message is to be re-broadcast, wherein the first message is one of the plurality of messages and is receivable by devices within a receiving range of the vehicle;
  receiving a second message comprising:
    second data associated with a second vehicle; and
    a configurable third value for a time-to-live parameter of the second message; and
  in response to the configurable third value specifying not to re-broadcast the second message, storing the second data.

19. The vehicle of claim 18, wherein the operations further comprise:
receiving a third message comprising:
  third data associated with a third vehicle; and
  a configurable fourth value for a time-to-live parameter of the third message; and
in response to the configurable fourth value specifying more than one hop for the time-to-live parameter of the third message:
  adjusting the configurable fourth value to determine a first value for the time-to-live parameter of the third message; and
  re-broadcasting the third message configured with the first value.

20. The vehicle of claim 18, further comprising:
a first transceiver configured to communicatively couple the vehicle to the first communication network, wherein the first communication network is associated with a first communication protocol; and
a second transceiver configured to communicatively couple the vehicle to a second communication network, wherein the second communication network is associated with a second communication protocol different from the first communication protocol,
wherein:
  the first message configured with the configurable first value is broadcasted using the first transceiver; or
  the first message configured with the configurable second value is broadcasted using the second transceiver.

* * * * *